US009282527B2

(12) United States Patent
Drevon et al.

(10) Patent No.: US 9,282,527 B2
(45) Date of Patent: Mar. 8, 2016

(54) SUPPORT OF MOBILE-TERMINATED SERVICE DELIVERY OVER A MULTI-RAT AND/OR MULTI-DOMAIN MOBILE NETWORK

(71) Applicant: Alcatel Lucent, Boulogne Billancourt (FR)

(72) Inventors: Nicolas Drevon, Nozay (FR); Laurent Thiebaut, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/374,829

(22) PCT Filed: Jan. 25, 2013

(86) PCT No.: PCT/EP2013/051470
§ 371 (c)(1),
(2) Date: Jul. 25, 2014

(87) PCT Pub. No.: WO2013/110777
PCT Pub. Date: Aug. 1, 2013

(65) Prior Publication Data
US 2015/0011210 A1 Jan. 8, 2015

(30) Foreign Application Priority Data
Jan. 27, 2012 (EP) ..................................... 12290034

(51) Int. Cl.
*H04W 60/00* (2009.01)
*H04W 8/10* (2009.01)
*H04W 8/18* (2009.01)

(52) U.S. Cl.
CPC .............. *H04W 60/005* (2013.01); *H04W 8/10* (2013.01); *H04W 8/18* (2013.01)

(58) Field of Classification Search
CPC ........... H04W 8/10; H04W 8/18; H04W 8/04; H04W 60/005; H04W 8/06; H04M 7/006; H04L 47/10
USPC ......... 455/435.2, 466, 435.1, 404.2; 370/259, 370/352; 709/227
See application file for complete search history.

(56) References Cited

U.S. PATENT DOCUMENTS

2007/0238468 A1  10/2007  Buckley et al.
2007/0258433 A1*  11/2007  Speight ........................ 370/349
(Continued)

FOREIGN PATENT DOCUMENTS

CN   102640548       8/2012
EP   2 282 561 A1    2/2011
(Continued)

OTHER PUBLICATIONS

International Search Report for PCT/EP2013/051470 dated May 13, 2013.
(Continued)

*Primary Examiner* — Phuoc H Doan
(74) *Attorney, Agent, or Firm* — Fay Sharpe LLP

(57) ABSTRACT

Embodiments of the present invention include a method for support of mobile-terminated service delivery over a multi-Radio Access Technology RAT and/or multi-domain mobile network wherein an User Equipment UE can be registered with multiple serving Core Network CN nodes, said method using information, referred to as termination selection information, including indication of a preferred serving CN node and/or preferred domain for mobile-terminated service delivery attempt towards said UE, said preferred serving CN node and/or said preferred domain determined as the serving CN node and/or domain most probably currently able to reach the UE, based on information referred to as termination selection support information retrieved from said multiple serving CN nodes, said method using, for said determination of the serving CN node and/or domain most probably currently able to reach the UE, termination selection support information including information on UE probability of camping per RAT.

21 Claims, 2 Drawing Sheets

(56) References Cited

U.S. PATENT DOCUMENTS

| | | |
|---|---|---|
| 2009/0287811 A1 | 11/2009 | Juhasz et al. |
| 2012/0269117 A1 | 10/2012 | Hu et al. |
| 2012/0307732 A1 | 12/2012 | Olsson et al. |
| 2013/0121212 A1* | 5/2013 | Guha et al. .................... 370/259 |

FOREIGN PATENT DOCUMENTS

| | | |
|---|---|---|
| JP | 2009-522963 | 6/2009 |
| JP | 2013-514686 | 4/2013 |
| WO | WO 2010/148754 | 12/2010 |
| WO | WO 2011/072747 A1 | 6/2011 |
| WO | WO 2012/008887 | 1/2012 |

OTHER PUBLICATIONS

ZTE, "Correct the 'MS' to the 'UE' which accesses via E-UTRAN", S2-113053 Change Request, 3GPP SA WG2 Meeting #86, Finland, Jul. 11-15, 2011.

\* cited by examiner

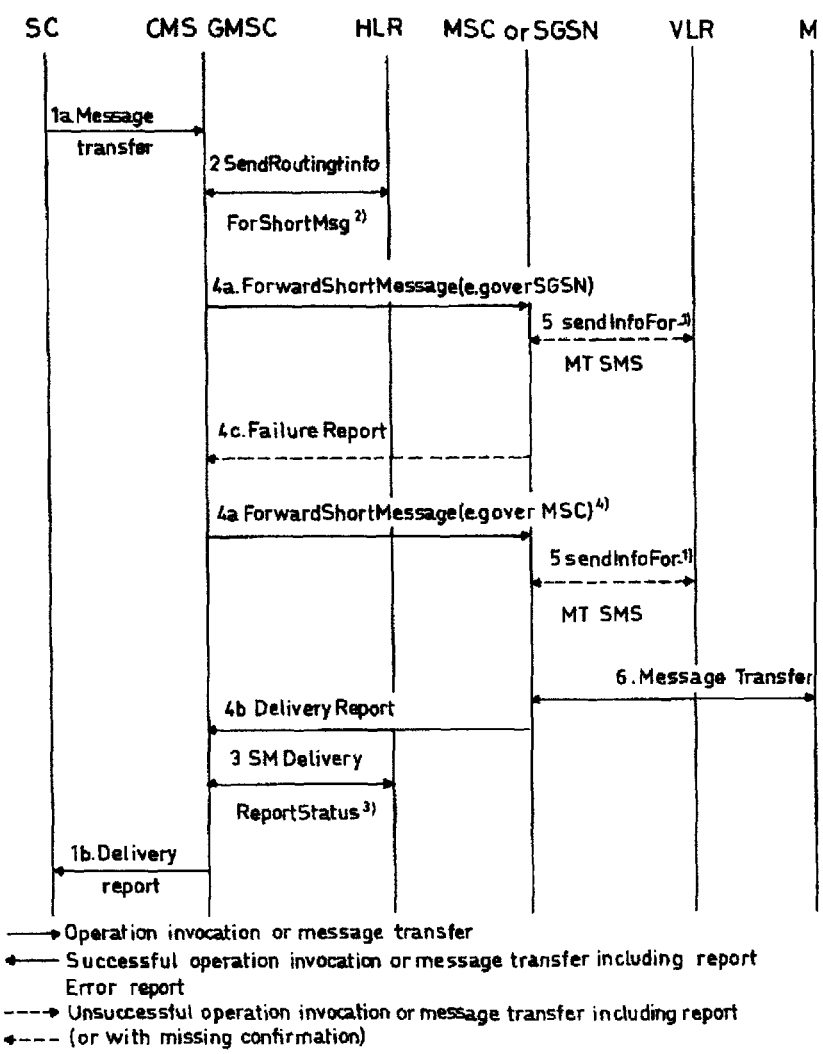
FIG_1

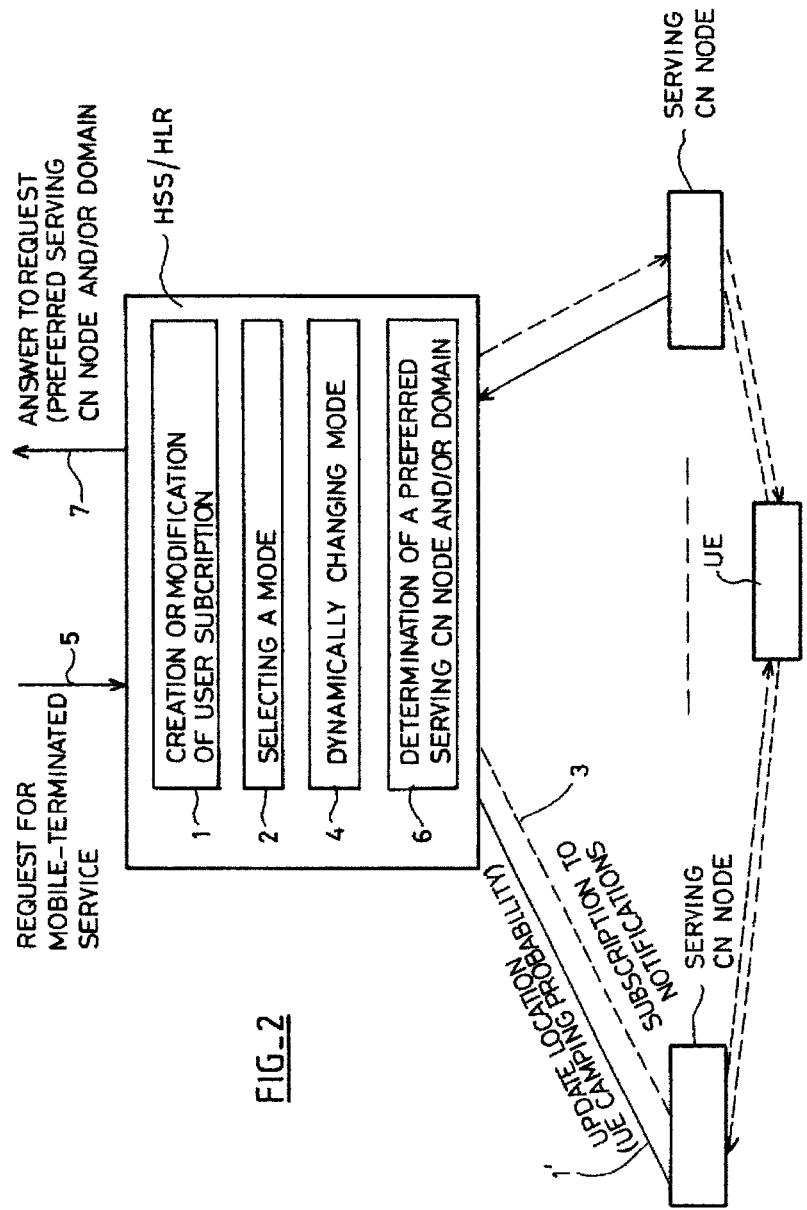
FIG_2

SUPPORT OF MOBILE-TERMINATED SERVICE DELIVERY OVER A MULTI-RAT AND/OR MULTI-DOMAIN MOBILE NETWORK

The present invention generally relates to mobile networks and systems and to mobile-terminated service delivery in such networks and systems.

Detailed descriptions of mobile networks and systems can be found in the literature, such as for example in Technical Specifications published by standardization bodies such as for example 3GPP ($3^{rd}$ Generation Partnership Project). Examples of mobile systems specified by 3GPP (for example) include GSM/GPRS, UMTS and EPS (Evolved Packet System).

In such systems, a terminal (also called User Equipment UE) has access to services via a mobile network, also called PLMN (Public Land mobile Network).

A mobile network generally comprises a Core Network (CN) accessed by a Radio Access Network (RAN). A mobile network may comprise one or more CN domains, such as in particular CS (Circuit-Switched) domain and/or PS (Packet-Switched) domain, accessed by one or more Radio Access Technologies (RAT). For example, CS Core Network and GPRS Core Network comprise respectively CS and PS domains accessed via GERAN/UTRAN, whereas Enhanced Packet Core comprises PS domain accessed via UTRAN/E-UTRAN. A mobile network may also comprise an IMS (IP Multimedia Subsystem) domain accessed by PS domain.

In order to have access to services from a given domain, an UE has to be attached to this domain i.e. to be registered in a serving CN node in this domain, such as MSC/VLR (in CS domain), SGSN (in GPRS/UMTS PS domain, or in EPC accessed by GERAN/UTRAN), MME (in EPC accessed by E-UTRAN). Routing information, in the form of serving CN node identities or addresses, is stored in a mobile network subscriber database such as HLR/HSS. For example, in CS domain, an UE is registered in a serving MSC/VLR, and in PS domain an UE may be registered in a serving SGSN and/or in a serving MME.

An example of service delivery in such networks and systems is the delivery of short message, in particular using the Short Message Service SMS as specified in particular in 3GPP TS 23.040. FIG. 1, taken from 3GPP TS 23.040, illustrates an example of mobile-terminated SMS delivery over GSM/UMTS. The SMS-GMSC interrogates the HLR, by sending a Send-Routing-Info-For-SM message, in order to retrieve routing information for SMS delivery. The short message is then transferred to the MSC/VLR or SGSN using the routing information obtained from the HLR. In case where two addresses (SGSN and MSC/VLR) are received from HLR, the SMS-GMSC may choose (operator dependent) via which nodes (SGSN or MSC/VLR) the SMS is to be sent first. In the example illustrated in FIG. 1, Short message transfer attempt is failing over the first path (e.g. SGSN) and succeeding over the second path (e.g. MSC/VLR).

Another example of service delivery in such networks and systems is IMS voice/video call service delivery, in particular using IMS Centralized Services (ICS) as specified in particular in 3GPP TS 23.292. As specified in particular in 3GPP TS 23.292, 3GPP TS 23.221, and 3GPP TS 29.328, a Terminating Access Domain Selection (T-ADS) function implemented in an Application Server called SCC AS (Service Centralization and Continuity Application Server) requests T-ADS information from the HSS, to select either CS or PS domain for service delivery.

Other examples of mobile-terminated service delivery using similar mechanisms or procedures are of course possible, such as for example delivery of an incoming device trigger e.g. as defined in 3GPP 23.682, . . . etc.

As recognized by the inventors and as will be explained later with more detail, there is a need to reduce the signalling load and/or the delays induced by such mobile-terminated service delivery mechanisms or procedures. More generally, there is a need to improve mobile-terminated service delivery in such networks and systems.

Embodiments of the present invention in particular address such needs.

These and other objects are achieved, in one aspect, by a method for support of mobile-terminated service delivery over a multi-Radio Access Technology RAT and/or multi-domain mobile network wherein an User Equipment UE can be registered with multiple serving Core Network CN nodes.

In an embodiment, said method uses information, referred to as termination selection information, including indication of a preferred serving CN node and/or preferred domain for mobile-terminated service delivery attempt towards said UE, said preferred serving CN node and/or said preferred domain determined as the serving CN node and/or domain most probably currently able to reach the UE, based on information referred to as termination selection support information retrieved from said multiple serving CN nodes.

Examples of termination selection information include: routing information sent by HSS/HLR to SMS-GMSC for mobile-terminated SMS delivery, routing information sent by HSS/HLR to a Device Trigger Gateway for mobile-terminated triggering, T-ADS information sent by HSS/HLR to SCC for IMS Voice/Video call service delivery using ICS, . . . etc.

Examples of termination selection support information include: last RAT and time stamp of the last radio contact with the UE sent by SGSN or MME to HLR/HSS, . . . etc.

In an embodiment, said method comprises:
using, for said determination of the serving CN node and/or domain most probably currently able to reach the UE, termination selection support information including information on UE probability of camping per RAT.

These and other objects are achieved, in other aspects, by mobile network entities for performing such method and/or individual step(s) of such method, said entities including, in particular (but not exclusively): mobile network database (such as for example HLR/HSS), and mobile network nodes (such as for example MME, SGSN . . . etc.).

Some embodiments of apparatus and/or methods in accordance with embodiments of the present invention are now described, by way of example only, and with reference to the accompanying drawings, in which:

FIG. 1 is intended to recall an example of procedure for mobile-terminated SMS delivery over GSM/UMTS, FIG. 2 is intended to illustrate determination, at a mobile network subscriber database, of a most recent serving CN node, according to embodiments of the present invention.

When an incoming SMS is sent to a mobile user, or an incoming/terminating voice/video call or any other terminating service (such as a location service or a device trigger request) is targeting a mobile UE, it is often possible to use multiple (CN) nodes serving the UE (e.g. MSC/VLR, SGSN, MME) and/or RATs (e.g. GERAN, UTRAN, EUTRAN, WLAN, . . . ) and/or Domains (CS, PS, IMS) in order to reach the UE and to execute the terminating service. It is nevertheless desirable to properly determine which CN node serving the UE to send the (first) request in order to optimize the chances to reach the target terminal at first trial and to minimize the signalling load.

For the SMS case, the terminal can be reached via MSCNLR, and/or via SGSN and/or via MME (when native SMS delivery is supported by MME). For voice/video call, the terminal can be reached either via Circuit Switched domain or via IMS over Packet Switched domain.

A network entity (e.g. SMS-GMSC or SMS-Router in case of SMS, or Device Trigger gateway in case of Device Triggering or SCC[1] AS in case of an incoming IMS voice/video call) responsible of the terminating service delivery to the UE is in charge of deciding to which serving CN node and/or RAT (e.g. GERAN, UTRAN, EUTRAN, WLAN, . . . ) and/or Domains (CS, PS, IMS) to send the first request in order to optimize the chances of success and minimize the network signaling load and delays to execute the terminating service.

[1] SCC application Server such as defined in 3gpp TS 23.237

This network entity (responsible of the terminating service delivery to the UE) looks up the HSS/HLR in order to get from the HSS/HLR a list of candidate serving CN nodes and/or domain and/or RAT to contact for delivering the terminating service to the UE with an indication of which of these candidate serving CN nodes and/or domain and/or RAT is the preferred one.

Embodiments of the invention relate to how the HSS/HLR determines which of these candidate serving CN nodes and/or domain and/or RAT is the preferred one e.g. the last one to have had a radio contact with the UE.

Background:

Existing 3GPP Mechanism for SMS:

In existing 3GPP networks (GSM, GPRS, UMTS, LTE), SMS is delivered per specified in 3GPP TS 23.040. In this specification, the SMS-GMSC interrogates the HLR by sending Send-Routing-Info-For-SM message (see clause 12.1) to retrieve information including the address of the CN node(s) the SMS data needs to be sent to. When there is a SMS Router node, the HLR uses the same Send-Routing-Info-For-SM procedure towards the SMS Router, which will send the response to the SMS-GMSC. The result may contain the MSC, SGSN, both MSC and SGSN addresses, or the address of the SMS Router. The SMS-GMSC (or the SMS-Router) sends the SMS data to the CN nodes indicated in the addresses, but only one after the other as indicated in figure 15-g) of clause 10.1, i.e. the SMS-GMSC waits for delivery report from the first CN node before deciding to send the SMS data to the second CN node if necessary (The SMS transfer towards the second path is only triggered by the reception of some MAP errors on the first path as described in sub clause 8.1.1).

The first CN node the SMS data is to be sent is configured in the SMS-GMSC or in the SMS-Router, and this configuration might not be the most efficient one at a given time, e.g. the UE might be reachable via the MSC/VLR only whereas the SGSN has been configured as the first CN node. Instead of a configured priority between the CN nodes (MSC, SGSN, MME), it would be possible to enhance the Send-Routing-Info-For-SM message with e.g. the Type of CN node to contact first—or the Radio Access Technology (GSM, UMTS, LTE, etc) and the Domain (Circuit, Packet)—in a dynamic manner.).

Existing 3GPP Mechanism for Voice Calls:

In 3GPP networks, in case an user has subscribed to Voice over IMS (VoIMS), incoming voice calls can be setup towards a called party using either circuit switched (CS) domain or packet switched (PS) domain (when the called terminal is capable of both CS voice and VoIMS, the decision to call the terminal via CS domain or via PS domain is performed in 3GPP standards (see TS 23.221, TS 23.292) by the SCC AS requesting the HSS/HLR for an indication on the first domain to try for setting up the voice call. This is dynamic as, upon request from the SCC AS, the HSS/HLR requests the MME and/or SGSN via Insert Subscriber Data procedure to provide the last Radio Access Technology type (GERAN, UTRAN, EUTRAN, etc) and the timestamp of the last radio contact with the UE as specified in TS 29.272.

Possible Mechanisms the HSS/HLR May Currently Use to Determine Which of These Candidate Serving CN Nodes and/or Domain and/or RAT is the Preferred One HSS/HLR may currently use following mechanisms to determine which of these candidate serving CN nodes and/or domain and/or RAT is the last one to have had a radio contact with the UE:

Pull: Upon request from the SMS-Router, the SCC AS, or any application, the HSS/HLR requests the CN nodes that serve the terminal (e.g. SGSN or MME) to return <<the support status of "IMS Voice over PS Sessions", the RAT Type and the timestamp of the last radio contact with the UE>> . . . .

The Pull mechanism is used at an incoming voice call to determine the CN node via which the UE can be reached with a very high probability to avoid any terminating call failure: unlike SMS, successful service delivery is related with the delay used to provide the service.

Push/Notify: A CN node (MSC/VLR, SGSN, MME) that serves the UE may have been requested by the HSS/HLR to notify the HSS/HLR when the next radio contact with the UE has been detected. This notification mechanism is one shot i.e. when it has notified the HSS/HLR, the serving CN node (e.g. MME and/or SGSN) clears the HSS/HLR subscription for notification as required by 3gpp TS 29.272:

If the MME sends a Notify Request to inform the HSS/HLR that the UE has become reachable again, the MME shall clear the corresponding URRP-MME for the UE.

If the SGSN sends a Notify Request to inform the HSS/HLR that the UE has become reachable again, the SGSN shall clear the corresponding URRP-SGSN for the UE.

This means that with current specification once the HSS/HLR has received a notification, if it wants to further receive other notifications, the HSS/HLR has to subscribe again.

The "passive" method: to determine which of serving CN nodes and/or domain and/or RAT is the last one to have had a radio contact with the UE, the HSS/HLR neither pulls the information upon request of one of its client nor subscribes to notifications from a serving Node about radio contact with the UE. This method currently can only rely on subscription data or on the time of the last Update location received from the CN nodes serving the UE (e.g. MME and/or SGSN).

The current mechanism cannot be used for the HSS/HLR to keep an up to date view of where the UE is (in order for the HSS/HLR to have in real time the knowledge of which serving CN node is the last one that has served the UE and is thus the preferred one for terminating service delivery).

Issues with Above-Mentioned Mechanisms, as Recognized by the Inventors:

These two mechanisms (Push/Pull) induce different signaling load in the Core Network, depending on the mobility of the user and on its traffic mix. For example a radio-connected vending machine is not moving at all while a device in a car is moving as soon as it is used; some terminals may only receive a very few number of terminating services (e.g. SMS) per month while other terminals may receive a lot of terminating services (e.g. calls) a day. The consequences are:

If the terminal is not moving or with limited mobility, notifying the HSS/HLR when the terminal moves is less signaling consuming than to pull the serving CN node each time there is a terminating service for this terminal.

If the terminal is moving often between E-UTRAN and GSM/GPRS (thus changing serving CN node and/or Domain) because e.g. of bad coverage and if this terminal does not receive terminating service very often, pulling the serving CN node is less signaling consuming than notifying the HSS/HLR each time the UE changes serving CN node/Domain.

If the terminal receives terminating service (e.g. SMS or voice/video calls) very often, but does not move so much, pulling mode might not be the best solution.

The existing solution for a Mobile Terminated voice/video call specified in TS 23.292, TS 29.272, TS 29.328 mandates the HSS/HLR to use the Pull solution i.e. to retrieve the above mentioned information from the SGSN or the MME. The existing solution for Mobile Terminated SMS delivery is to always use the priority order configured in the SMS-GMSC or the SMS-Router.

To determine to which CN node or/and Domain (CS, PS, IMS) the first request will be sent, the 3GPP standards don't take into account:

the mobility profile (e.g. fixed terminal, moving terminal) and the traffic mix profile of the terminal (e.g. for each type of services such as voice/video, SMS, device triggering, LCS, . . . ) configured in the HSS/HLR, or the UE and/or network capabilities (the camping strategy of the UE and of the VPLMN), or information derived from the observation of the actual services use. This might lead to important signalling load in the network.

Especially in the "passive" mode, the HSS/HLR can only rely on user subscription data and on the last Update Location received from the Serving Node, but cannot take into account UE capabilities and Radio (or VPLMN) camping policies.

Embodiments of the Invention

Embodiments of the invention include different aspects.

In a first aspect, the serving CN Nodes (e.g. MME or SGSN) provide the HSS/HLR with an indication on the "UE capabilities and visited network capabilities and camping policies", that consist in an indication of probability of camping per RAT for the UE sent by the serving CN Node to the HSS/HLR.

In another aspect, the determination of the indication of probability of camping per RAT for the UE is actually made by the RAN and possibly takes into account:

The Subscriber Profile ID for RAT/Frequency Priority (SPID) parameter sent by the serving Node of the UE (e.g. MME and/or SGSN) to the RAN. The SPID is used by the RAN to configure specific camping policies into the UE (e.g. to define RRC_IDLE mode priorities) and to control inter-RAT/inter frequency handover in RRC_CONNECTED mode. It is defined in TS 48.018 for GERAN, TS 25.413 for UTRAN, TS 36.413 for EUTRAN;

The UE radio capabilities;

Local configuration on the RAN e.g. the nature of the deployment of the various RAT in the area.

In another aspect, the HSS/HLR dynamically selects the method (push or pull or "passive") used to be made aware of which serving CN node has had the last radio contact with an UE (and possibly on which RAT).

In another aspect, the decision of the HSS/HLR (pull or push or "passive" method to be made aware of which serving CN node has had the last radio contact with the UE (and possibly on which RAT)) may take into account:

User subscription information configured in the HSS/HLR;

an indication from the serving CN nodes on the "UE capabilities and visited network capabilities and camping policies";

whether the CN nodes serving the UE have indicated they the support an enhanced Push method;

an indication from the serving CN Nodes on whether ISR may apply for the UE (if deployed in the VPLMN and supported by the UE);

the observed mobility & incoming traffic profile of the UE that is derived from the HSS/HLR observation of the UE behaviour (e.g. ratio between the number of mobility events and/or of terminating service requests for the UE).

In another aspect, as part of the user subscription information configured in the HSS/HLR, the existing "RFSP Index" is used, which is part of the subscription profile in the HSS/HLR which is used to configure whether the subscriber is e.g. a moving terminal, a vending machine, etc. The "RFSP Index" is defined in TS 23.401 and TS 23.060, and also named "Subscribed-RAT-Frequency-Selection-Priority-ID" in TS 23.008.

In another aspect, the HSS/HLR is able to subscribe for notification onto a CN node serving the UE (e.g. MME and/or SGSN and/or MSC/VLR) for persistent notification of the radio contacts with the UE (enhanced push method)

(i.e. a subscription for notification that is not removed after the first notification from the CN node serving the UE (e.g. MME and/or SGSN and/or MSC/VLR));

This subscription for notification may be associated with trigger conditions that help the HSS/HLR to limit the flow of the associated notifications;

These different aspects in particular enable to minimize the signaling load while maximizing the chance to reach the UE at first trial.

In terms of information exchange between functional entities, embodiments of the invention add:

The capability for a CN node serving the UE (e.g. MME and/or SGSN and/or MSC/VLR) to provide the HSS with information on "UE capabilities and visited network capabilities and camping policies"

This information may be carried by a S6a/S6d Update-Location-Request (ULR).

It may take the form of a camping probability (e.g. high, medium, low) per RAT

The capability for a RAN[2] node to provide a CN node serving the UE (e.g. MME and/or SGSN and/or MSCNLR) with information on "UE capabilities and visited network capabilities and camping policies"

[2] Radio Access Network

This information is carried over S1 (LTE RAN) and/or Iu (UTRAN) and/or A/Gb (GERAN)

It may take the form of a camping probability (high, medium, low) per RAT

It is determined by the RAN based on
- The Subscriber Profile ID for RAT/Frequency Priority (SPID) parameter sent by the CN Node serving the UE (e.g. MME and/or SGSN) to the RAN. This index is used by the RAN to configure specific camping policies into the UE (e.g. to define RRC_IDLE mode priorities) and to control inter-RAT/inter frequency handover in RRC_CONNECTED mode. It is defined in TS 48.018 for GERAN, TS 25.413 for UTRAN, TS 36.413 for EUTRAN.
- The UE radio capabilities;
- Local configuration on the RAN e.g. the nature of the deployment of the various RAT in the area The capability for the HSS to subscribe for notification onto a CN node serving the UE (e.g. MME and/or SGSN and/or MSC/VLR) for persistent notification of the radio contacts with the UE (push method) or of change of "UE capabilities and visited network capabilities and camping policies"
- This subscription for notification may be associated with trigger conditions that help the HSS/HLR to limit the flow of the associated notifications. Those trigger conditions may include:
  - a minimum delay between 2 notifications sent about an UE;
  - a request to receive notifications of radio contacts with UE only upon UE Attach or updates of service area, but excluding service area updates for UE already in Connected mode;
  - a service area corresponding to Routing Area or a set of Tracking Areas.
- The subscription request may be carried by a S6a/S6d Update-Location-Answer (ULA) or Insert-Subscriber-Data-Request message (possibly using the IDR-Flags plus a new information element for the trigger conditions);
- The associated notification may be carried by a S6a/S6d Notify-Request (NOR).

The capability for the HSS/HLR to request that the serving CN node purges the mobile upon Detach and hence notifies the HSS/HLR when it has detached the UE;

The capability for a CN node serving the UE (e.g. MME and/or SGSN) to indicate to the HSS whether it supports notifications of persistent notification of the radio contacts with the UE (push method):
- This should be carried by a S6a/S6d Update-Location-Request (ULR). New values in ULR-Flags could be used for that purpose (more than one value when the CN node serving the UE is capable to indicate the support of multiple throttling conditions).

S6a/S6d are defined in 3GPP TS 29.272. They correspond to interfaces between the HSS and respectively a MME and a SGSN Other embodiments of the invention are described in following steps, illustrated in FIG. 2.
1. An user subscription is created or modified and/or 1' the HSS/HLR is notified that an user is now reachable through a new serving CN node (Update Location received from that node)
   - The Update Location may contain an indication from the serving CN nodes on the "UE capabilities and visited network capabilities and camping policies"
2. (based on 1 and/or 1') the HSS/HLR selects the mode of operation (push/pull/"passive") to determine the last serving CN node that has had a radio contact with the UE (and possibly on which RAT)

This determination may take into account:
- The user subscription information configured in the HSS/HLR e.g. containing indication on
  - the expected mobility of the UE (e.g. fixed terminal, moving terminal), and/or
    - This may be stored in the "RFSP Index", which is part of the user subscription information in the HSS/HLR
  - the expected service set of the UE i.e. the traffic mix profile of the UE (e.g. for each type of services such as voice/video, SMS, Location, Device Trigger, . . . ) (e.g. a PC data dongle is not assumed to receive incoming calls and not assumed to receive a lot of incoming SMS);
- an indication from the serving CN nodes on the "UE capabilities and visited network capabilities and camping policies" and on VoIMS support capability
- whether the CN nodes serving the UE have indicated they support the enhanced Push method;
- an indication from the serving CN nodes on whether ISR may apply for the UE (if deployed in the VPLMN and supported by the UE);

3. When the enhanced push (or notify) mode of operation is chosen for an UE and a serving CN node, the HSS/HLR subscribes onto this serving CN node to notifications of the radio contacts with the UE.
   This subscription for notification may be associated with trigger conditions that help the HSS/HLR to limit the flow of the associated notifications.
4. The mode of operation used for an UE may be dynamically changed based on the HSS/HLR observation of the UE behaviour (ratio between the number of mobility events and of terminating service requests for the UE)

When there is a Terminating Request for the UE:
5. The HSS/HLR receives (from a network entity responsible of a terminating service delivery to the UE) a request to get information about which candidate serving CN nodes and/or RAT and/or domains to use for the incoming service delivery and which of these candidates CN nodes is the preferred one (the serving CN node via which there is the highest chance to reach the UE). This request may correspond to:
   - a Send-Routing-Info-For-SM message from the SMS-GMSC (or SMS Router) in case the terminating service is the delivery of an incoming SMS, or
   - a Device trigger request in case the terminating service is the delivery of an incoming device trigger, or
   - a Data-Pull from the SCC AS in case the terminating service is the delivery of an incoming call
   etc. . . .
6. The HSS/HLR determines which of the CN nodes (e.g. MME, SGSN, MSC/VLR) currently serving the UE can serve the incoming request (list of candidate serving CN nodes) and which upon those candidate serving CN nodes is the last one that should have had a radio contact with the UE (this serving CN node is the preferred serving CN node through which to route the incoming service request).
   To do so, the HSS/HLR checks:
   - the last time, stored on the HSS/HLR, the UE was detected by each candidate CN entity where the UE is registered to, and
   - the current mode of operation (push/pull/"passive") to determine the last serving CN node that has had a radio contact with the UE.
     - If the current mode of operation is "pull" or if the last time stored on the HSS/HLR is considered too old for the type of incoming request, the HSS/HLR pulls the information about the last radio contacts from the candidate serving CN nodes.

Otherwise the HSS/HLR takes into account the locally stored information on the last radio contacts of the serving CN nodes with the UE.

7. The HSS/HLR answers to its client (network entity responsible of a terminating service delivery to the UE) with a list of candidate serving CN nodes and an indication of the last one that should have had a radio contact with the UE.

Examples (*) of choices for the mode of operation (push/pull/"passive") to determine the last serving CN node that has had a radio contact with the UE (and possibly on which RAT)

The passive method may e.g. be chosen when
  the incoming services for the UE are rare and delay tolerant i.e. may be provided with some delay incurred by a failure attempt via a serving CN node followed by a retry via another serving CN node (e.g. SMS), OR
  A CN node serving an UE has indicated a high camping probability over a RAT and the incoming services for the UE are delay tolerant The enhanced Push method may e.g. be chosen when ISR can't apply to the UE AND it is supported by the serving CN node AND
  The subscription indicates a UE with limited or no mobility, OR
  The HSS has observed a high ratio between the number of incoming services and the number of mobility events for the UE (*) These examples are only illustrative In one aspect, there is provided a method for support of mobile-terminated service delivery over a multi-Radio Access Technology RAT and/or multi-domain mobile network wherein an User Equipment UE can be registered with multiple serving Core Network CN nodes.

Various embodiments are provided, which may be used alone or in combination, according to various combinations.

In an embodiment, said method uses information, referred to as termination selection information, including indication of a preferred serving CN node and/or preferred domain for mobile-terminated service delivery attempt towards said UE, said preferred serving CN node and/or said preferred domain determined as the serving CN node and/or domain most probably currently able to reach the UE, based on information referred to as termination selection support information retrieved from said multiple serving CN nodes.

In an embodiment, said method comprises:
using, for said determination of the serving CN node and/or domain most probably currently able to reach the UE, termination selection support information including information on UE probability of camping per RAT.

In an embodiment, said method comprises:
dynamically selecting one of multiple modes of retrieving termination selection support information from serving CN nodes.

In an embodiment, said method comprises:
using, for said determination of the serving CN node and/or domain most probably currently able to reach the UE and/or for dynamic selection of one of multiple modes of retrieving termination selection support information from serving CN nodes, user subscription for said UE.

In an embodiment, said method comprises:
enhancing a mode of retrieving termination selection support information from serving CN nodes based on subscribing, onto a serving CN node, to notifications of changes of said information, by a subscription remaining active in a serving CN node after a first notification from this serving CN node.

In an embodiment, said method comprises a step of:
a serving CN node signalling to a mobile network subscriber database responsible for said determination of the serving CN node and/or domain most probably currently able to reach the UE, termination selection support information including information on UE probability of camping per RAT.

In an embodiment, said method comprises a step of:
a serving CN node signalling to a mobile network subscriber database responsible for said determination of the serving CN node and/or domain most probably currently able to reach the UE, termination selection support information including information on UE capabilities and/or visited network capabilities and/or camping policies for said UE.

In an embodiment, said method comprises a step of:
a serving Radio Access Network RAN node controlled by a serving CN node signalling an indication of UE probability of camping per RAT, to said serving CN node.

In an embodiment, said method comprises a step of:
a serving Radio Access Network RAN node controlled by a serving CN node determining an indication of UE probability of camping per RAT, from information including at least one of:
  a Subscriber Profile ID for RAT/Frequency Priority SPID parameter sent by said serving CN Node to said RAN node,
  UE radio capabilities;
  Local configuration on the RAN.

In an embodiment, said method comprises a step of:
a serving CN node sending to a mobile network subscriber database an Update Location Request containing information on UE probability of camping per RAT.

In an embodiment, said method comprises a step of:
a mobile network subscriber database responsible for said determination of the serving CN node and/or domain most probably currently able to reach the UE dynamically selecting one of multiple modes of retrieving termination selection support information from serving CN nodes, based on at least one of:
  subscription information configured in the mobile network subscriber database for said UE;
  an indication from serving CN nodes on UE probability of camping per RAT;
  whether serving CN nodes have indicated they support a mode of retrieving termination selection support information from said serving CN nodes, based on a subscription, onto said serving CN nodes, to notifications of changes of said information, wherein a subscription to notifications remains active in a serving CN node after a first notification from this serving CN node;
  an indication from serving CN nodes on whether Idle Mode Signalling Reduction ISR is deployed in a visited network and supported by the UE;
  an observed mobility and incoming traffic profile of the UE that is derived from an observation by the subscriber database of the UE behaviour.

In an embodiment, said method comprises a step of:
a mobile network subscriber database responsible for said determination of the serving CN node and/or domain most probably currently able to reach the UE dynamically selecting, for retrieving termination selection support information from serving CN nodes, one of multiple modes including:
  pull-based mode, wherein the subscriber database pulls information from serving CN nodes, push-based mode, wherein, after a request from the subscriber database, serving CN nodes notify the mobile network subscriber database upon information changes, passive mode, relying on UE subscription information and/or on the time of last Update Location Request received from serving CN nodes.

In an embodiment, said method comprises a step of:

a mobile network subscriber database responsible for said determination of the serving CN node and/or domain most probably currently able to reach the UE dynamically selecting one of multiple modes for retrieving termination selection support information from serving CN nodes, based on subscription information configured in said mobile network subscriber database for said UE, said subscription information including a RAT/Frequency Selection Priority RFSP Index parameter.

In an embodiment, said method comprises a step of:

a mobile network subscriber database responsible for said determination of the serving CN node and/or domain most probably currently able to reach the UE selecting, for retrieving termination selection support information from serving CN nodes, a mode based on subscribing, onto a serving node, to notifications of changes of said information, wherein a subscription to notifications remains active in a serving CN node after a first notification from this serving CN node.

In an embodiment, said method comprises a step of:

a mobile network subscriber database responsible for said determination of the serving CN node and/or domain most probably currently able to reach the UE subscribing, onto a serving CN node, to notifications of changes of UE probability of camping per RAT or subscribing, onto a serving CN node, to notifications of radio contacts with UE.

In an embodiment, said method comprises a step of:

a mobile network subscriber database responsible for said determination of the serving CN node and/or domain most probably currently able to reach the UE, requiring the serving CN node to purge the UE upon Detach of this UE and hence to notify the mobile network subscriber database when it has detached the UE.

In an embodiment, said method comprises a step of:

a mobile network subscriber database responsible for said determination of the serving CN node and/or domain most probably currently able to reach the UE selecting, for retrieving termination selection support information from serving CN nodes, a mode based on subscribing, onto a serving CN node, to notifications of changes of said information, wherein a subscription to notifications remains active in a serving CN node after a first notification from this serving CN node, if Idle Mode Signalling Reduction ISR cannot apply to the UE, and said mode is supported by the serving CN node, and the UE subscription information indicates a UE with limited or no mobility, or the subscriber database has observed a high ratio between the number of incoming services and the number of mobility events for the UE.

In an embodiment, said method comprises a step of:

a mobile network subscriber database responsible for said determination of the serving CN node and/or domain most probably currently able to reach the UE selecting, for retrieving termination selection support information from serving CN nodes, a mode based on subscribing, onto a serving CN node, to notifications, by said serving CN node, of changes of said information, wherein a subscription to notification remains active in a serving CN node after a first notification from this serving CN node, subject to trigger conditions including at least one of:

a minimum delay between two notifications sent about the UE;

a request to receive notifications of radio contacts with UE only upon UE Attach or updates of service area, but excluding service area updates for UE already in Connected mode, a service area corresponding to Routing Area or a set of Tracking Areas.

In an embodiment, said method comprises a step of:

a serving CN node indicating to a mobile network subscriber database responsible for said determination of the serving CN node and/or domain most probably currently able to reach the UE, whether said serving CN node supports a mode of retrieving termination selection support information from serving CN nodes, based on the network subscriber database subscribing, onto a serving CN node, to notifications of changes of said information, wherein a subscription to notifications remains active in a serving CN node after a first notification from this serving CN node.

In an embodiment, said method comprises a step of:

a mobile network subscriber database responsible for said determination of the serving CN node and/or domain most probably currently able to reach the UE selecting, for retrieving termination selection support information from serving CN nodes, a passive mode relying on user subscription information and/or on the time of a last Update Location Request received from a serving CN node, when mobile-terminated services for the UE are rare and delay tolerant, or a serving CN node has indicated a high camping probability over a RAT and the mobile-terminated services for the UE are delay tolerant.

IN an embodiment, said method comprises the steps of, upon reception, by a mobile network subscriber database of a request to get termination selection information for mobile-terminated service delivery for an UE:

the mobile network subscriber database checking:

the last time, stored on the mobile network subscriber database, the UE was detected by the serving CN nodes, the current mode selected by said mobile network subscriber database to determine the serving CN node and/or domain most probably currently able to reach the UE, if the current mode is a pull-based mode wherein the subscriber database pulls information from serving CN nodes, or if the last time stored on the subscriber database is considered too old for the mobile-terminated service, the subscriber database pulling information from serving CN nodes, otherwise the subscriber database taking into account locally stored information on the last time stored on the subscriber database.

Other aspects and embodiments relate to mobile network entities configured for performing such method and/or individual step(s) of such method, said entities including, in particular (but not exclusively): mobile network database (such as for example HLR/HSS), and mobile network nodes (such as for example MME, SGSN, . . . etc.).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for support of mobile-terminated service delivery over a multi-Radio Access Technology (RAT) and/or multi-domain mobile network wherein an User Equipment (UE) can be registered with multiple serving Core Network (CN) nodes, said method comprising:
   using termination selection information, including indication of a preferred serving CN node and/or preferred domain for mobile-terminated service delivery attempt towards said UE, said preferred serving CN node and/or said preferred domain determined as the serving CN node and/or domain most likely to reach the UE, based on termination selection support information retrieved from said multiple serving CN nodes;
   using, for said determination of the serving CN node and/or domain most likely to reach the UE, termination selection support information including information on UE probability of camping per RAT.

2. The method according to claim 1, comprising dynamically selecting one of multiple modes of retrieving termination selection support information from serving CN nodes.

3. The method according to claim 1, comprising using, for said determination of the serving CN node and/or domain most likely to reach the UE and/or for dynamic selection of one of multiple modes of retrieving termination selection support information from serving CN nodes, user subscription for said UE.

4. The method according to claim 1, comprising enhancing a mode of retrieving termination selection support information from serving CN nodes based on subscribing, onto a serving CN node, to notifications of changes of said information, by a subscription remaining active in a serving CN node after a first notification from this serving CN node.

5. The method according to claim 1, comprising:
a serving CN node signalling to a mobile network subscriber database configured to determine the serving CN node and/or domain most likely to reach the UE, termination selection support information including information on UE probability of camping per RAT.

6. The method according to claim 1, comprising:
a serving CN node signalling to a mobile network subscriber database configured to determine the serving CN node and/or domain most likely to reach the UE, termination selection support information including information on UE capabilities and/or visited network capabilities and/or camping policies for said UE.

7. The method according to claim 1, comprising:
a serving Radio Access Network (RAN) node controlled by a serving CN node signalling an indication of UE probability of camping per RAT, to said serving CN node.

8. The method according to claim 1, comprising:
a serving Radio Access Network (RAN) node controlled by a serving CN node determining an indication of UE probability of camping per RAT, from information including at least one of:
   a Subscriber Profile ID for RAT/Frequency Priority SPID parameter sent by said serving CN Node to said RAN node,
   UE radio capabilities;
   Local configuration on the RAN.

9. The method according to claim 1, comprising a step of:
a serving CN node sending to a mobile network subscriber database an Update Location Request containing information on UE probability of camping per RAT.

10. The method according to claim 1, comprising:
a mobile network subscriber database configured to determine the serving CN node and/or domain most likely to reach the UE dynamically selecting one of multiple modes of retrieving termination selection support information from serving CN nodes, based on at least one of:
   subscription information configured in the mobile network subscriber database for said UE;
   an indication from serving CN nodes on UE probability of camping per RAT;
   whether serving CN nodes have indicated they support a mode of retrieving termination selection support information from said serving CN nodes, based on a subscription, onto said serving CN nodes, to notifications of changes of said information, wherein a subscription to notifications remains active in a serving CN node after a first notification from this serving CN node;
   an indication from serving CN nodes on whether Idle Mode Signalling Reduction (ISR) is deployed in a visited network and supported by the UE;
   an observed mobility and incoming traffic profile of the UE that is derived from an observation by the subscriber database of the UE behaviour.

11. The method according to claim 1, comprising:
a mobile network subscriber database configured to determine the serving CN node and/or domain most likely to reach the UE dynamically selecting, retrieve termination selection support information from serving CN nodes, one of multiple modes including:
   pull-based mode, wherein the subscriber database pulls information from serving CN nodes,
   push-based mode, wherein, after a request from the subscriber database, serving CN nodes notify the mobile network subscriber database upon information changes,
   passive mode, relying on UE subscription information and/or on the time of last Update Location Request received from serving CN nodes.

12. The method according to claim 1, comprising:
a mobile network subscriber database configured to determine the serving CN node and/or domain most likely to reach the UE dynamically selecting one of multiple modes for retrieving termination selection support information from serving CN nodes, based on subscription information configured in said mobile network subscriber database for said UE, said subscription information including a RAT/Frequency Selection Priority RFSP Index parameter.

13. The method according to claim 1, comprising:
a mobile network subscriber database configured to determine the serving CN node and/or domain most likely to reach the UE selecting, for retrieving termination selection support information from serving CN nodes, a mode based on subscribing, onto a serving node, to notifications of changes of said information, wherein a subscription to notifications remains active in a serving CN node after a first notification from this serving CN node.

14. The method according to claim 1, comprising:
a mobile network subscriber database configured to determine the serving CN node and/or domain most likely to reach the UE subscribing, onto a serving CN node, to notifications of changes of UE probability of camping per RAT or subscribing, onto a serving CN node, to notifications of radio contacts with UE.

15. The method according to claim 1, comprising:
a mobile network subscriber database configured to determine the serving CN node and/or domain most likely to reach the UE, requiring the serving CN node to purge the UE upon Detach of this UE and hence to notify the mobile network subscriber database when it has detached the UE.

16. The method according to claim 1, comprising:
a mobile network subscriber database configured to determine the serving CN node and/or domain most likely to reach the UE selecting, for retrieving termination selection support information from serving CN nodes, a mode based on subscribing, onto a serving CN node, to notifications of changes of said information, wherein a subscription to notifications remains active in a serving CN node after a first notification from this serving CN node, if Idle Mode Signalling Reduction ISR cannot apply to the UE, and said mode is supported by the serving CN node, and
   the UE subscription information indicates a UE with limited or no mobility, or
   the subscriber database has observed a high ratio between the number of incoming services and the number of mobility events for the UE.

17. The method according to claim 1, comprising:
a mobile network subscriber database configured to determine the serving CN node and/or domain most likely to reach the UE selecting, for retrieving termination selection support information from serving CN nodes, a mode based on subscribing, onto a serving CN node, to notifications, by said serving CN node, of changes of said information, wherein a subscription to notification remains active in a serving CN node after a first notification from this serving CN node, subject to trigger conditions including at least one of:
   a minimum delay between two notifications sent about the UE;
   a request to receive notifications of radio contacts with UE only upon UE Attach or updates of service area, but excluding service area updates for UE already in Connected mode, a service area corresponding to Routing Area or a set of Tracking Areas.

18. The method according to claim 1, comprising:
a serving CN node indicating to a mobile network subscriber database configured to determine the serving CN node and/or domain most likely to reach the UE, whether said serving CN node supports a mode of retrieving termination selection support information from serving CN nodes, based on the network subscriber database subscribing, onto a serving CN node, to notifications of changes of said information, wherein a subscription to notifications remains active in a serving CN node after a first notification from this serving CN node.

19. The method according to claim 1, comprising:
a mobile network subscriber database configured to determine the serving CN node and/or domain most likely to reach the UE selecting, for retrieving termination selection support information from serving CN nodes, a passive mode relying on user subscription information and/or on the time of a last Update Location Request received from a serving CN node, when
   mobile-terminated services for the UE are rare and delay tolerant, or
   a serving CN node has indicated a high camping probability over a RAT and the mobile-terminated services for the UE are delay tolerant.

20. The method according to claim 1, comprising, upon reception, by a mobile network subscriber database of a request to get termination selection information for mobile-terminated service delivery for an UE:
   the mobile network subscriber database checking:
      the last time, stored on the mobile network subscriber database, the UE was detected by the serving CN nodes,
      the current mode selected by said mobile network subscriber database to determine the serving CN node and/or domain most likely to reach the UE,
   if the current mode is a pull-based mode wherein the subscriber database pulls information from serving CN nodes, or if the last time stored on the subscriber database is considered too old for the mobile-terminated service, the subscriber database pulling information from serving CN nodes,
   otherwise the subscriber database taking into account locally stored information on the last time stored on the subscriber database.

21. A mobile network entity, configured to perform a a method for support of mobile-terminated service delivery over a multi-Radio Access Technology (RAT) and/or multi-domain mobile network wherein an User Equipment (UE) can be registered with multiple serving Core Network (CN) nodes, said method using information, referred to as termination selection information, including indication of a preferred serving CN node and/or preferred domain for mobile-terminated service delivery attempt towards said UE, said preferred serving CN node and/or said preferred domain determined as the serving CN node and/or domain most likely to reach the UE, based on information referred to as termination selection support information retrieved from said multiple serving CN nodes, said method using, for said determination of the serving CN node and/or domain most likely to reach the UE, termination selection support information including information on UE probability of camping per RAT.

* * * * *